United States Patent
Faydi et al.

(10) Patent No.: US 10,444,947 B1
(45) Date of Patent: *Oct. 15, 2019

(54) DOCUMENT LAYER EXTRACTION FOR MOBILE DEVICES

(71) Applicant: Adobe Inc., San Jose, CA (US)

(72) Inventors: Clement Faydi, Brooklyn, NY (US); David J. Pond, Morrison, CO (US); Oliver I. Goldman, Seattle, WA (US); Daniel Clark, Big Sur, CA (US); Roey F. Horns, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,715

(22) Filed: Jun. 11, 2019

Related U.S. Application Data

(63) Continuation of application No. 14/668,742, filed on Mar. 25, 2015, now Pat. No. 10,359,909.

(51) Int. Cl.
*G06F 3/0484* (2013.01)
*G06F 3/0482* (2013.01)
*H04L 29/08* (2006.01)
*G06F 3/0488* (2013.01)

(52) U.S. Cl.
CPC ........ *G06F 3/0482* (2013.01); *G06F 3/04842* (2013.01); *G06F 3/04883* (2013.01); *H04L 67/02* (2013.01)

(58) Field of Classification Search
None
See application file for complete search history.

(56) References Cited

U.S. PATENT DOCUMENTS

| | | |
|---|---|---|
| 10,359,909 B2 | 7/2019 | Faydi et al. |
| 2008/0320055 A1 | 12/2008 | Sagar et al. |
| 2009/0138808 A1 | 5/2009 | Moromisato et al. |
| 2010/0231590 A1 | 9/2010 | Erceis et al. |
| 2013/0016921 A1 | 1/2013 | Beltowski et al. |
| 2013/0236119 A1 | 9/2013 | Campbell et al. |
| 2014/0205207 A1 | 7/2014 | Bhatt |

(Continued)

OTHER PUBLICATIONS

"Final Office Action", U.S. Appl. No. 14/668,742, dated Dec. 28, 2017, 11 pages.

(Continued)

*Primary Examiner* — David H Chu
(74) *Attorney, Agent, or Firm* — SBMC

(57) ABSTRACT

In embodiments of document layer extraction for mobile devices, an image service can receive a request from a mobile device for a multi-layered image, and the image service generates a layer extraction as a full-resolution image of each of the layers of the multi-layered image. The image service can then generate a component representation of the layer extractions that correspond to selected layers of the multi-layered image, where the layer extractions are independently editable in the component representation. The image service can then communicate the component representation of the layer extractions that are independently editable and correspond to the selected layers of the multi-layered image to the mobile device for use with an image editing application on the mobile device, and the image service receives image edit changes made to one or more of the selected layers in the component representation of the multi-layered image from the mobile device.

20 Claims, 13 Drawing Sheets

(56) References Cited

U.S. PATENT DOCUMENTS

2014/0225928 A1     8/2014    Konnola et al.
2016/0283049 A1     9/2016    Faydi et al.

OTHER PUBLICATIONS

"Lesson 15: Layer on layer with z-index (Layers)", Retrieved from <https://web.archive.org/web/20110108035720/http://html.net/tutorials/css/lesson15.php>, Jan. 8, 2011, 2 pages.

"Non-Final Office Action", U.S. Appl. No. 14/668,742, dated Jul. 13, 2018, 13 pages.

"Non-Final Office Action", U.S. Appl. No. 14/668,742, dated Jul. 13, 2017, 9 pages.

"Notice of Allowance", U.S. Appl. No. 14/668,742, dated Mar. 13, 2019, 8 pages.

Kost,"Drag-Select Multiple Layers in Photoshop", Retrieved from <https://web.archive.org/web/20131114145803/http://blogs.adobe.com/jkost/2013/11/drag-select-multiple-layers-in-photoshop.html, Nov. 14, 2013, 1 page.

Virgil,"Photoshop Touch: The Power of Photoshop in Your Pocket", Retrieved from <http://iphone.appstorm.net/reviews/graphics/photoshop-touch-the-power-of-photoshop-in-your-pocket/>, May 13, 2013, 9 pages.

DOCUMENT LAYER EXTRACTION FOR MOBILE DEVICES

RELATED APPLICATION

This application is a continuation of and claims priority to U.S. patent application Ser. No. 14/668,742 filed Mar. 25, 2015 entitled "Document Layer Extraction for Mobile Devices," the disclosure of which is incorporated by reference herein in its entirety.

BACKGROUND

Many device users have portable electronic and computing devices, such as mobile phones, tablet computers, multimedia devices, and similar mobile devices. Although these types of mobile devices are increasingly designed with more memory and processing capabilities, they are still not designed with the storage capacity and the extensive processing capability needed to handle large image data files, such as is common with digital photos, layered images created with multiple image layers, and other large image data files. One such example is Adobe Photoshop™ documents (PSD) that are widely used across all creative industries. For example, designers, illustrators, architects, and motion designers will likely, at some point in creative processes, interact with a PSD file to compose a new image or retouch an existing one. Typically, the PSD files can only be opened in the Photoshop™ application on a desktop computer having the storage capacity and processing capability to handle the large image data files, yet many creative users generally use mobile devices and very often use other applications to create images. However, given that the Photoshop™ documents are typically very large image files, and due to device storage capacity and network bandwidth limitations inherent with using mobile devices, it is frequently impractical to download an entire PSD to a mobile device, either as a native document or as a collection of layer images rendered at full resolution.

SUMMARY

This Summary introduces features and concepts of document layer extraction for mobile devices, which is further described below in the Detailed Description and/or shown in the Figures. This Summary should not be considered to describe essential features of the claimed subject matter, nor used to determine or limit the scope of the claimed subject matter.

Document layer extraction for mobile devices is described. In embodiments, a cloud-based image service can receive a request from a mobile file browser on a mobile device for a multi-layered image, and the image service communicates an image preview of the multi-layered image to the mobile device for display. An example of a multi-layered image is a Photoshop™ document (PSD) that is created as an image with multiple layers including both image layers and non-image layers, and which can be a large-data image file. The cloud-based image service includes an imaging application that generates the image preview of the multi-layered image, such as a thumbnail or rendition of the image.

The imaging application can also generate image layer previews, such as thumbnail images, of the multiple layers of the multi-layered image, where each image layer preview is representative of one of the multiple layers of the image. The cloud-based image service also communicates the image layer previews of the multiple layers of the multi-layered image to the mobile device for display. Additionally, the image service provides metadata of the multi-layered image to the mobile device, where the metadata includes identifiers of the multiple layers of the multi-layered image. The image preview of the multi-layered image that is received from the cloud-based image service, as well as the image layer previews of the multiple layers of the multi-layered image, can be displayed in a user interface of a mobile file browser at the mobile device.

The cloud-based image service also includes an extraction application that generates a layer extraction of each of the multiple layers of the multi-layered image, where the layer extraction of a layer is generated as a full-resolution image of the layer. For example, the layer extractions can be generated for each of the multiple layers of a Photoshop™ document (PSD) (e.g., a multi-layered image that includes image layers and/or non-image layers). A user can select image layer previews that are displayed in the user interface of the mobile file browser at the mobile device, and identifiers of the layers that correspond to the selected image layer previews are communicated to the cloud-based image service. The image service receives the identifiers of the layers and the extraction application generates a component representation of the layer extractions that correspond to the identified layers of the multi-layered image. The component representation also includes a description that indicates how the layer extractions in the component representation are to be composited at the mobile device. The cloud-based image service can then communicate the component representation of the layer extractions and the description of how the layer extractions are to be composited to the mobile device, such as for use with an image editing application.

A user can also select a region of the multi-layered image displayed as the image preview in the user interface of the mobile file browser, such as with touch or gesture inputs to a region selector that may be a user-drawn selection boundary on the displayed image, or a user-sizeable layers viewing control displayed in the user interface over the image. The mobile file browser implements a layer extraction module that determines a layers group of the layers that are part of the selected region of the multi-layered image based on the identifiers of the layers that are included in the metadata received from the cloud-based image service. The mobile file browser can communicate the identifiers of the layers that are included in the layers group to the image service, and the imaging application generates an image layers rendition of the layers group. The mobile file browser can then receive back the image layers rendition of the layers group from the cloud-based image service for display at the mobile device.

BRIEF DESCRIPTION OF THE DRAWINGS

Embodiments of document layer extraction for mobile devices are described with reference to the following Figures. The same numbers may be used throughout to reference like features and components that are shown in the Figures.

DETAILED DESCRIPTION

Figure 1:
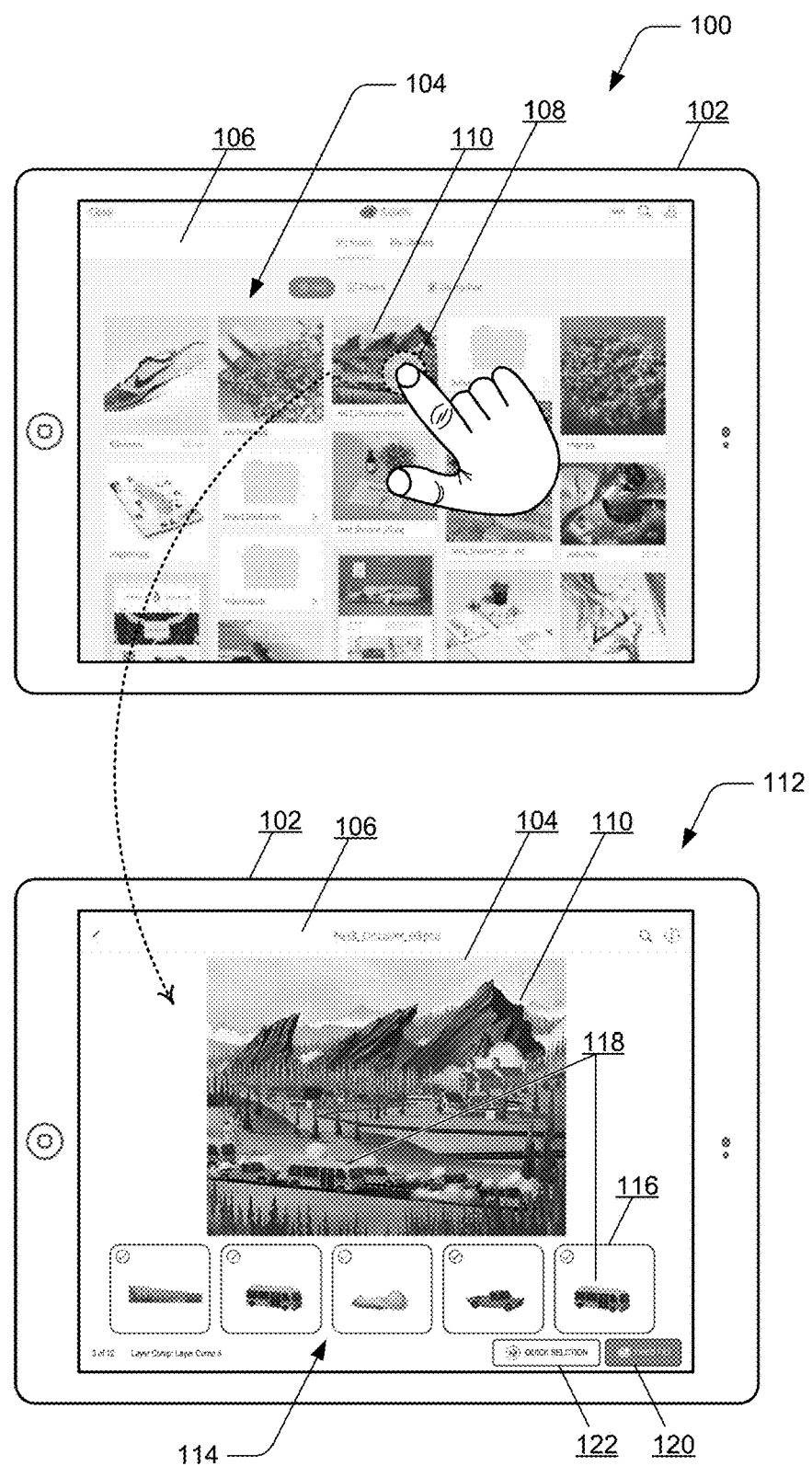
FIG. 1 illustrates an example of document layer extraction for mobile devices in accordance with one or more embodiments of the techniques described herein.

Embodiments of document layer extraction for mobile devices are described, and the techniques provide that layer extractions of the many layers of a multi-layered image, such as a Photoshop™ document (PSD), can be generated as individual full-resolution bitmaps and downloaded to a mobile device for use with an imaging application, while a user selects and displays an image preview of the image in a user interface of a mobile file browser on the mobile device. The user can also select image layer previews that correspond to layers of a multi-layered image in the user interface on the mobile device, and based on identifiers of the selected layers, a component representation is generated that includes the layer extractions that correlate to the selected layers of the multi-layered image. The component representation is also generated to include a description that indicates how the group of layer extractions in the component representation are to be composited at the mobile device.

The component representation of the layer extractions provides an efficient way to make a PSD (or other type of large file) editable on a mobile device, and to present a representation of part or the whole multi-layered image to a user, while allowing the user to select out particular layers to focus on and edit. An extraction application is implemented as a service of a cloud-based image service that generates the layer extractions of the image layers, and the mobile device can download (e.g., "extract") one or more of these full-resolution layer extractions as the user selects layers when navigating the layer hierarchy of the multi-layered image. In addition, the user interface of the mobile file browser provides that a user of a mobile device can use touch and gesture inputs to select only those image layers that are of interest to a user, which restricts the layer hierarchy navigation to only the selected layer nodes and applied layer compositions, and disregards layers that are not visible when the image or selected region of the image is displayed on the mobile device.

The mobile file browser itself does not utilize the layer extractions of the component representation, but rather utilizes image layers metadata information associated with the multi-layered image to discern a layer hierarchy and list of layer compositions that make up the multi-layered image. Based on the metadata information, the mobile file browser can initiate a request to the cloud-based image service for an imaging application to generate thumbnail and preview renditions of the multiple layers, which may include image layers and non-image layers, for display on the mobile device. The mobile file browser can also request an image preview of the multi-layered image for display at the mobile device, and the image preview corresponds to the current default view state of the image.

While features and concepts of document layer extraction for mobile devices can be implemented in any number of different devices, systems, networks, environments, and/or configurations, embodiments of document layer extraction for mobile devices are described in the context of the following example devices, systems, and methods.

FIG. 1 illustrates an example 100 of a mobile device 102, such as the tablet device shown in this example, in which embodiments of document layer extraction for mobile devices can be implemented. As detailed in the system description shown in FIG. 2, the mobile device 102 can display image previews 104 (e.g., thumbnails or renditions) of multi-layered images in a user interface 106 of a mobile file browser, where the multi-layered images that are represented by the image previews 104 are maintained at a cloud-based image service, such as in Adobe Creative Cloud™. An example of a multi-layered image is an Adobe Photoshop™ document (PSD) that can be created utilizing hundreds or thousands of layers, and where the multiple layers of a multi-layered image can include image layers and non-image layers, such as text, shapes, 3D models, and other non-image layers.

Due to device storage capacity and network bandwidth limitations inherent with using mobile devices, it is frequently impractical to download entire Photoshop™ documents or other types of large files, either as native documents or as collections of layer images rendered at full resolution. Because these types of images are typically very large data image files, the much smaller (e.g., less data) image previews 104 can be generated and displayed as thumbnails or renditions for initial user preview and selection. For example, a user may touch-select 108 one of the image previews 104 that represents a multi-layered image 110, and the image preview 104 of the multi-layered image 110 is displayed in the user interface 106 of the mobile file browser as shown at 112.

In this example, the user interface 106 of the mobile file browser also displays image layer previews 114 in a layers grid below the image preview 104 of the multi-layered image 110. The image layer previews 114 are thumbnail images that are each representative of one of the multiple layers of the multi-layered image 110. For example, an image layer preview 116 represents the image layer of the multi-layered image 110 that includes the bus object 118. The other image layer previews 114 that are shown displayed in the user interface 106 represent other image layers that include various objects of the multi-layered image 110. In implementations, the image layer previews 114 may also represent the non-image layers of a PSD document or other type of large file. In this example, the user interface 106 of the mobile file browser also includes other user-selectable controls, such as an open file control 120 to initiate opening a document file, and a quick selection control 122 to activate a quick selection of an area to extract layers of the multi-layered image 110. Features that may be initiated by selection of the quick selection control 122 are further described with reference to FIGS. 8-11.

Figure 2:
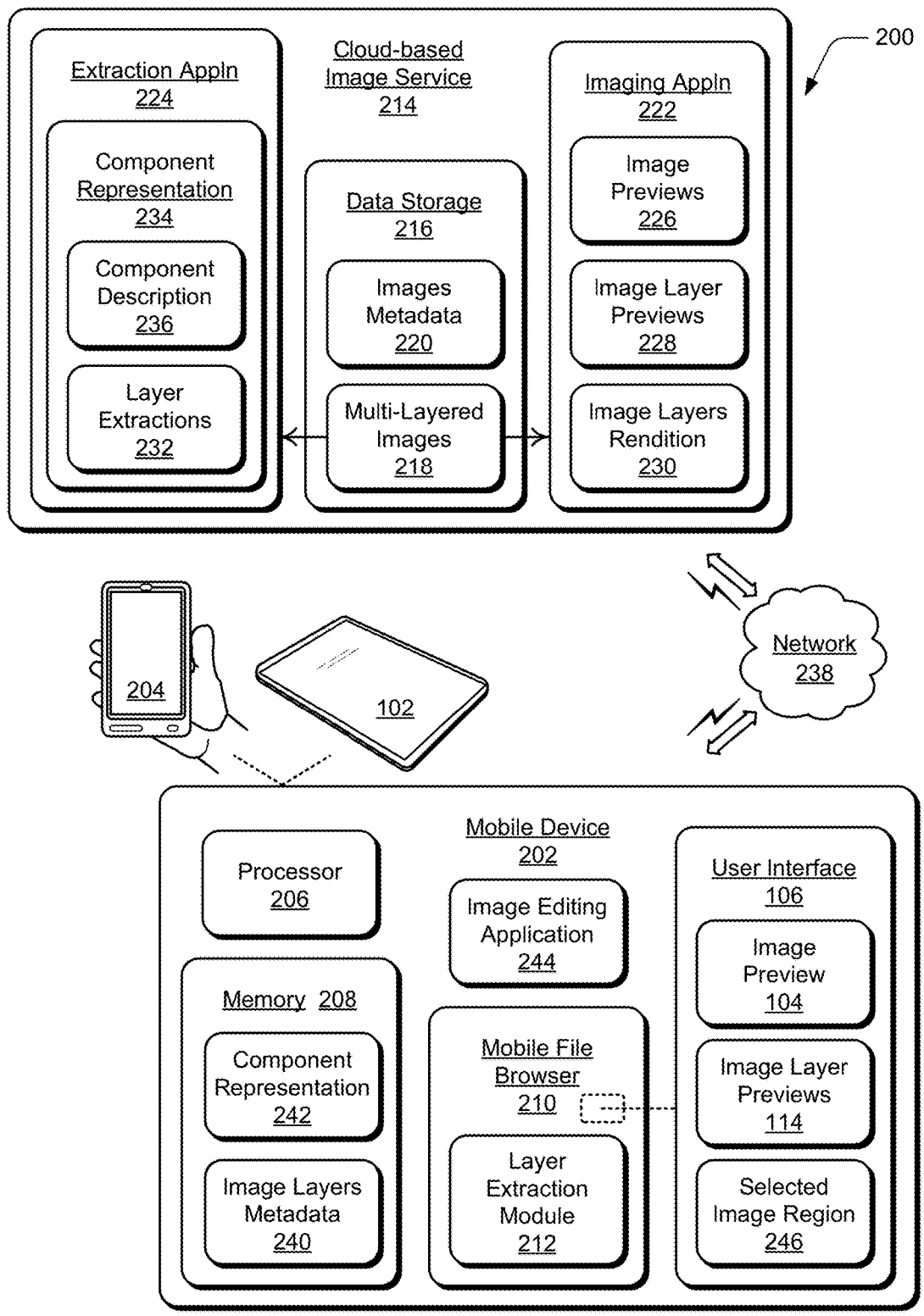
FIG. 2 illustrates an example system in which embodiments of document layer extraction for mobile devices can be implemented.

FIG. 2 illustrates an example system 200 in which embodiments of document layer extraction for mobile devices can be implemented. The example system 200 includes a mobile device 202, such as the tablet device 102 shown in FIG. 1, a mobile phone 204, and/or any other type of a media playback, computing, communication, gaming, entertainment, or portable electronic media device. The mobile device 202 can be implemented with various components, such as a processor 206 (or processing system) and memory 208, and with any number and combination of differing components as further described with reference to the example device shown in FIG. 15. Although not shown, the mobile device 202 also includes a power source, such as a battery, to power the various device components. Further, the mobile device 202 can include different wireless radio systems, such as for Wi-Fi, Bluetooth™, BLE, Mobile Broadband, LTE, or any other wireless communication system or format. Generally, the mobile device 202 implements a communication system that includes a radio device, antenna, and chipset that is implemented for wireless communication with other devices, networks, and services.

The mobile device 102 includes a mobile file browser 210 (also referred to and described with reference to FIG. 1). The mobile file browser can be implemented as a software application or module, such as executable software instructions (e.g., computer-executable instructions) that are executable with the processor 206 (or with a processing system) to implement embodiments of document layer extraction for mobile devices. The mobile file browser 210 can be stored on computer-readable storage memory (e.g., the device memory 208), such as any suitable memory device or electronic data storage implemented in the mobile device. In this example, the mobile file browser 210 includes a layer extraction module 212 implemented as a software module (e.g., computer-executable instructions) on the device. Although shown and described as an integrated module of the mobile file browser 210 in this example, the layer extraction module 212 may be implemented as an independent module or component on the mobile device 202.

In implementations, the mobile file browser 210 provides that a user of the mobile device 202 can navigate the layers of multi-layered images, such as Photoshop™ documents, graphically without having to download the images or documents in whole or in part. The mobile file browser 210 avoids the need for excessive storage and network utilization for the large data image files, and other types of large data files, by only downloading the previews (e.g., thumbnails or renditions) for the layers of a multi-layered image that the user selects or navigates to, such as with touch and gesture inputs on the user interface 106 of the mobile file browser. The user interface 106 is also shown and described with reference to FIG. 1.

The example system 200 includes a cloud-based image service 214, such as Adobe Creative Cloud™ as described with reference to FIG. 1. The image service 214 includes data storage 216 that may be implemented as any suitable memory, memory device, or electronic data storage for network-based data storage. The data storage maintains the large data multi-layered images 218 (also referred to as full-sized images), such as the Adobe Photoshop™ documents (PSD) that may be created utilizing hundreds or thousands of layers, to include image layers and non-image layers, such as text, shapes, 3D models, and other non-image layers. The image service 214 also maintains images metadata 220 of the multi-layered images 218, where the images metadata 220 can include any type of data that describes a multi-layered image, such as layer types, layer bounding boxes, layer compositions, identifiers of the multiple layers of the multi-layered image, and the like.

The cloud-based image service 214 can also be implemented with server devices that are representative of one or multiple hardware server devices of the image service. Further, the cloud-based image service 214 can be implemented with various components, such as a processing system and memory, as well as with any number and combination of differing components as further described with reference to the example device shown in FIG. 15 to implement services, applications, servers, and other features of document layer extraction for mobile devices. In implementations, the cloud-based image service 214 implements an imaging application 222 and an extraction application 224, both of which can be implemented as software applications or modules, such as executable software instructions (e.g., computer-executable instructions) that are executable with a processor or processing system of the image service.

The imaging application 222 and the extraction application 224 can be stored on computer-readable storage memory, such as any suitable memory device or electronic data storage implemented at the image service. Although shown and described as separate applications, the imaging application 222 and the extraction application 224 may be implemented as a single application, as multiple software modules, or in other configurations at the cloud-based image service 214, such as on multiple server devices.

The imaging application 222 at the cloud-based image service 214 is implemented to generate an image preview 226 of a multi-layered image 218, and generate the image layer previews 228 of the multiple layers of the multi-layered image. For example, the imaging application 222 generates the image previews 104 (e.g., thumbnails or renditions) of the multi-layered images that are displayed in the user interface 106 of the mobile file browser, as shown and described with reference to FIG. 1. The imaging application 222 also generates the image layer previews 114 as the thumbnail images that are each representative of one of the multiple layers of the multi-layered image 110, as shown displayed in the user interface 106 in FIG. 1. The imaging application 222 can also generate an image layers rendition 230 of layers that are included in a layers group as part of a selected region of a multi-layered image 218. This is further described below with reference to a user selecting a region of a multi-layered image for display in the user interface 106 of the mobile file browser 210, and the browser can request a set of layers in a batch that are the immediate children of the layer group being viewed.

The extraction application 224 at the cloud-based image service 214 is implemented to generate full-resolution layer extractions 232 (e.g., as full-resolution bitmaps) of each of the multiple layers of a multi-layered image 218. For example, the Adobe Creative Cloud™ (e.g., the cloud-based image service 214) provides the extraction application 224 as a service that can take apart and render all of the layers (or a group of layers) of a Photoshop™ document (PSD) individually. The extraction application 224 can then combine one or more of the individual layer extractions 232 (e.g., the full-resolution bitmaps) into a component representation 234. The component representation also includes a component description 236 that indicates how the group of layer extractions in the component representation 234 are to be composited at the mobile device 202.

For example, if a user of the mobile device 202 selects a particular five layers out of a hundred of a multi-layered image, such as based on selecting the image layer previews 114 of the multi-layered image 110 displayed in the user interface 106 as shown in FIG. 1, then the mobile file browser 210 can request to download the component description 236 plus the five full-resolution layer extractions 232 in the component representation 234 that correspond to the selected layers. In implementations, a component representation also provides a mechanism by which the image metadata 220 of a multi-layered image 218 (e.g., a PSD document or other large data file) can be downloaded to the mobile device 202, and then the mobile file browser 210 can use that information to download, edit, and/or upload changes to the selected layers of the multi-layered image. Further, utilizing the component representation 234 of one or more individual layer extractions 232 from a multi-layered image 218 avoids having to download the complete large-data, native PSD file in-whole or in-part to the mobile device.

By utilizing the combination of the imaging application 222 for rendition previews and the extraction application 224 for component representation of full-resolution image layers at the cloud-based image service 214, the mobile file browser 210 at the mobile device 202 can efficiently implement capabilities of document layer extraction for mobile devices without having to download a native multi-layered image either in-whole or in-part. For example, a user on a mobile device can select a multi-layered image 218, such as a Photoshop™ document (PSD), from the cloud-based image service 214, such as the Adobe Creative Cloud™, without having to download the entire PSD to the mobile device.

In implementations, the extraction application 224 at the cloud-based image service 214 can generate the full-resolution layer extractions 232 of each of the multiple layers of a multi-layered image 218, and then combine one or more of the individual layer extractions 232 into a digital composite (DCX) representation (e.g., as a component representation 234). A DCX representation also includes a DCX manifest as the component description 236 that describes how the group of layer extractions in a DCX representation are to be composited at the mobile device 202. The digital composites technology is further described in a section below.

The example system 200 includes a network 238 and any of the devices, servers, and/or services described herein can communicate via the network, such as for data communication between the mobile device 202 and the cloud-based image service 214. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. For example, the cloud-based image service 214 can include an image service application (e.g., an executable software application) that is implemented to receive data communications from the mobile device 202 via the network 238, process and interface the data communications with other image service applications (e.g., the imaging application 222, the extraction application 224, etc.), and initiate data communications back to the mobile device via the network.

In embodiments, a user of the mobile device 202 can select one or more of the multi-layered images 218 that are stored in the data storage 216 at the cloud-based image service 214. The user can initiate the selection of a multi-layered image in the user interface 106 of the mobile file browser 210, such as shown in FIG. 1 by the user touch-selection 108 of the image preview 104 that represents the multi-layered image 110 in the user interface 106 on the mobile device 102. The cloud-based image service 214 can then receive a request from the mobile file browser 210 on the mobile device 202 for the selected multi-layered image, and the image service communicates an image preview 226 of the multi-layered image 218 to the mobile device for display as the image preview 104 of the image 110 in the user interface 106 of the mobile file browser, such as shown at 112 in FIG. 1.

The cloud-based image service 214 also communicates the image layer previews 228 of the multiple layers of a multi-layered image 218 to the mobile device 202 for display as the image layer previews 114 in the user interface 106 of the mobile file browser. Additionally, the cloud-based image service 214 provides the images metadata 220 of a multi-layered image 218 to the mobile device 202, where the metadata includes identifiers of the multiple layers of the multi-layered image and is maintained as the image layers metadata 240 with memory 208 on the mobile device.

A user can then select one or more of the displayed image layer previews 114 in the user interface 106 of the mobile file browser 210. The extraction application 224 (or other image service application) at the cloud-based image service 214 receives the selection of the image layer previews 114 from the mobile device 102, and initiates communication of the component description 236 plus the full-resolution layer extractions 232 in the component representation 234 that correspond to the selected image layer previews back to the mobile device. The component representation of the layer extractions 232 that are received from the cloud-based image service 214 can be maintained as the component representation 242 in memory 208 on the mobile device. In embodiments, the cloud-based image service 214 communicates the layer extractions 232 of one or more of the multiple layers of a multi-layered image 218 to the mobile device 202 for use with an image editing application 244, such as Adobe Photoshop™, or any creative, mobile, or other type of image editing application. The mobile device 202 includes the image editing application 244 (e.g., an executable software application) that a user of the mobile device can utilize to view and edit the full resolution layers of the multi-layered image that are received at the mobile device as the layer extractions 232 in the component representation 234.

A user of the mobile device 202 can also select a region of a multi-layered image (e.g., displayed as the image preview 104) in the user interface 106 of the mobile file browser 210, such as with touch or gesture inputs to a region selector that may be a user-drawn selection boundary on the displayed image or a user-sizeable layers viewing control displayed in the user interface over the image. Examples of a user selecting an image region 246 of a displayed image preview 104 are shown and further described with reference to FIGS. 8-10.

The user of the mobile device 202 can navigate the layer hierarchy of a multi-layered image in the user interface 106 of the mobile file browser 210, where the layer hierarchy may include a tree of layer nodes that are either leaf layers (e.g., bitmap image layers, color layers, etc.) or layer groups (e.g., collections of children layer and layer groups) starting at the root layer group. The user can use touch and gesture inputs to select only the layers that are within the selected image region 246 of the multi-layered image 218 (e.g., displayed as the image preview 104). Further, the mobile file browser 210 can apply a layer composition to restrict the display of the multi-layered image to only the layers that are visible for that particular layer composition (e.g., the selected image region 246). The layer composition is a collection of the layer identifiers as determined by the layer extraction module 212, where each included layer has a visibility setting that is set to indicate the layer is visible (e.g., displayed), and those layers that are not included have the visibility setting set to indicate that the layer is not visible.

The mobile file browser 210 implements the layer extraction module 212 that determines a layers group of the layers that are part of the selected image region 246 of the multi-layered image based on the identifiers of the layers that are included in the image layers metadata 240 received from the cloud-based image service 214. The mobile file browser 210 can communicate the identifiers of the layers that are included in the layers group to the image service 214, and the imaging application 222 generates the image layers rendition 230 of the layers group. The mobile file browser 210 can then receive back the image layers rendition 230 of the layers group from the cloud-based image service 214 for display at the mobile device. Additionally, the layer extraction module 212 can initiate downloading the layer extractions 232 and the component description 236 in the component representation 234 from the cloud-based image service 214, and the extracted image layers are maintained as the component representation 242 on the mobile device.

In aspects of document layer extraction for mobile devices, the layer extractions 232 in the component representation 234 of the layers of a multi-layered image 218 (e.g., a Photoshop™ document) can be generated by the extraction application 224 and downloaded for layer extraction at the mobile device 202 while a user selects and displays the image preview 104 in the user interface 106 of the mobile file browser 210. However, the mobile file browser 210 itself does not utilize the layer extractions 232 of the layers, but rather utilizes the image layers metadata 240 information associated with the multi-layered image 218 to discern the layer hierarchy and list of layer compositions that are present in the document. Based on the metadata information, the mobile file browser 210 can initiate a request to the cloud-based image service 214 for the imaging application 222 to generate the thumbnail or preview renditions of the layers for display at the mobile device.

Generally, while the user navigates the layer hierarchy represented by the image layer previews 228 displayed in the user interface 106 for an image preview 104, the mobile file browser 210 requests the smaller data-sized previews or renditions of the layer nodes for the layer group being browsed, and because these are not the larger data, full-sized images, they require minimal storage and network bandwidth. Further, the mobile file browser 210 initiates background downloads of the layer extractions 232 (e.g., in the component representation 234) that the user has already selected. This provides an efficiency in that, by the time the user has finished making layer selections of the image layer preview 110 in the user interface 106, much of the full-resolution image layer data that needs to be made available to the image editing application 244 (e.g., the calling application, such as Adobe Photoshop™) will have at least already been initiated, if not already completed downloading to the mobile device. Accordingly, the mobile file browser 210 implements an efficient PSD layer extraction from cloud-based Photoshop™ documents with minimal device storage and network bandwidth utilized, and also provides the full-resolution image data (e.g., the layer extractions 232) in an efficient and as timely a manner as possible.

Digital Composites Technology

The digital composites (DCX) technology is a framework for the creation of digital media in a mobile-first, cloud-connected environment. The DCX framework implementation can be used to organize creative works as a set of components. Component media types and relations are recorded in a well-known syntax, which furthers remix as part of the creative process. Features of DCX are also used for network transfer algorithms providing efficient, correct synchronization using standard cloud-scale storage services and web protocols. Taken together, these capabilities enable seamless creativity across mobile, desktop, and cloud.

Digital composites (DCX) are aggregations of components in well-known media types treated as a unit. As described herein, this approach provides advantages for mobile applications and for cloud synchronization. The data model for DCX models creative creations, such as sketchbooks, images, 3D models, videos, and the like as a structured set of related components. The root file of a digital composite is called the manifest, which contains a JSON serialization of the DCX data model, as described below. The JSON data interchange format is widely supported across mobile, desktop, and cloud environments.

At the core of the DCX data model is the structure tree, which organizes all of the components of a given creation. This tree is stored and serialized in JSON, in the manifest. The nodes provide the scaffolding by which the structure tree captures organization and the nodes are stored as JSON objects in the manifest. Creations are organized around pages, layers, scenes, and so on, and these correspond to the nodes in the tree. The organization of the tree into nodes, and the relationships between them, are further described below, and the DCX implementation allows different specific organizations to be used in order to support a broader range of media types. The components in the DCX tree contain the data that make up the composite, which can include the images, video clips, vectors, 3D models, and so on. Each component is referenced by one node in the structure tree, but the component data itself is stored independently. All of the components that make up a structural element, such as a page, can be found referenced from within the sub-tree rooted at the element's corresponding node in the tree.

Although the creative process has been extended to mobile devices, this does not mean that the creative process takes place beginning-to-end on a single device. Users move between multiple devices, desktop and mobile, throughout the day and the DCX model accommodates the multi-device user. The DCX model implements cloud-compatible atomic updates to ensure the atomic update of a composite, which is essential to making DCX viable to prevent and detect corruption due to missing, mismatched, or overwritten components. The update mechanism provides that updates to the entire composite are atomic.

The DCX model introduces a new mechanism providing atomic updates to sets of files that requires only single-file atomic update guarantees. This is implemented by making each version of each component individually addressable, and then using the manifest to demarcate transaction boundaries. Component versions can be made individually addressable in one of two ways. Most cloud storage providers provide this as an intrinsic capability. If an intrinsic versioning capability is not available, then the version can be encoded in the name of the component and the cloud storage service will simply see this as a new file. Note that there is no need for components to have friendly names in storage.

Component references are by version, and when a composite is uploaded to the cloud, the resulting version of each component is noted and recorded in the manifest. Conversely, download requests are always of a specific version, as specified by the manifest, and given version-specific references, there is no need for additional concurrency control applied to the components. Client devices can safely upload and download components, in any combination, at will. A key step in achieving transactional updates is to insure that each client device is using a consistent set of versioned component references, which is accomplished by storing that set in the manifest. As the manifest is a single file, only the atomic updates to the manifest itself are needed to achieve atomic updates to the entire composite. The manifest thus serves as a transactional proxy, in that either the entire component reference set is committed, or none of it is.

For example, a second application can be attempting to download a composite while a first application is uploading an update. The second application cannot know the version numbers of the updated components, because the new manifest has not yet been uploaded. Therefore, it will download only the set of components consistent with its current copy of the manifest. Similarly, a second application can be attempting a simultaneous upload, and each will write new versions of various components. For some components, two distinct new versions will be uploaded, one from each client. However, only one, consistent set will be in the manifest written by each client. When two clients compete to commit a manifest, they use optimistic concurrency control on the manifest to detect the conflict.

Example methods 300 and 400 are described with reference to respective FIGS. 3 and 4 in accordance with one or more embodiments of document layer extraction for mobile devices. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
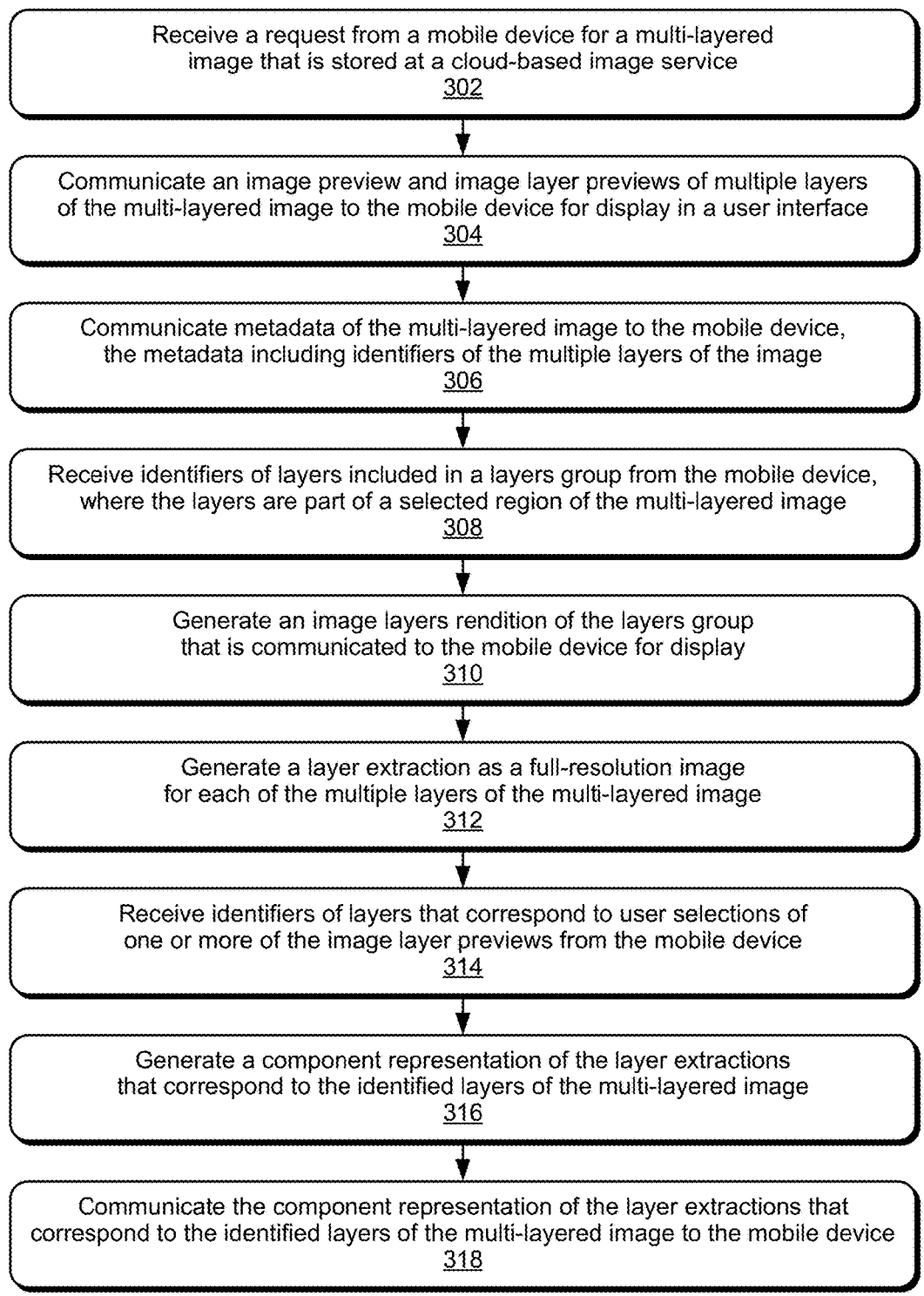
FIG. 3 illustrates example methods of document layer extraction for mobile devices in accordance with one or more embodiments of the techniques described herein.

FIG. 3 illustrates example method(s) 300 of document layer extraction for mobile devices, and is generally described with reference to the cloud-based image service shown in the example system of FIG. 1. The order in which the method is described is not intended to be construed as a limitation, and any number or combination of the method operations can be combined in any order to implement a method, or an alternate method.

At 302, a request is received from a mobile device for a multi-layered image that is stored at a cloud-based image service. For example, the cloud-based image service 214 receives a request from the mobile file browser 210 of the mobile device 202 for a multi-layered image 218, such as a Photoshop™ document (PSD). A user can initiate the selection of the multi-layered image in the user interface 106 of the mobile file browser 210, such as shown in FIG. 1 by the user touch-selection 108 of the image preview 104 that represents the multi-layered image 110 in the user interface 106 on the mobile device 102.

At 304, an image preview and image layer previews of multiple layers of the multi-layered image are communicated to the mobile device for display in a user interface of a mobile file browser. For example, the cloud-based image service 214 communicates an image preview 226 that is representative of the multi-layered image 218 to the mobile device for display as the image preview 104 in the user interface 106. The cloud-based image service 214 also communicates the image layer previews 228 of the multiple layers of the multi-layered image 218 to the mobile device 202 for display as the image layer previews 114 in the user interface 106. Examples are illustrated in FIG. 1 as the image preview 104 of the multi-layered image 110 and the image layer previews 114 displayed in the user interface 106 of the mobile file browser at 112. The image layer previews 228 are renditions or thumbnail images that are each representative of one of the multiple layers of the multi-layered image, and the cloud-based image service 214 may communicate only the image layer previews that correspond to visible layers in the multi-layered image displayed at the mobile device.

At 306, metadata of the multi-layered image is communicated to the mobile device, the metadata including identifiers of the multiple layers of the multi-layered image. For example, the cloud-based image service 214 provides the images metadata 220 of the multi-layered image 218 to the mobile device 202, where the metadata includes identifiers of the multiple layers of the multi-layered image. The images metadata 220 that is communicated from the cloud-based image service 214 is maintained in the memory 208 of the mobile device 202 as the image layers metadata 240.

At 308, identifiers of layers included in a layers group are received from the mobile device, where the layers in the layers group are part of a selected region of the multi-layered image. For example, the cloud-based image service 214 receives identifiers of the layers included in a layers group from the mobile device 202 when a user of the device selects an image region 246 of the multi-layered image 110 (e.g., displayed as the image preview 104) in the user interface 106 of the mobile file browser 210, and the layers in the layers group of the selected region 246 of the multi-layered image 110 are determined at the mobile device based on the identifiers included in the image layers metadata 240.

At 310, an image layers rendition of the layers group is generated for communication to the mobile device for display. For example, the imaging application 222 at the cloud-based image service 214 generates the image layers rendition 230 of the layers in the layers group based on the identifiers of the layers received from the mobile device, and then the image service 214 communicates the image layers rendition 230 of the layers group back to the mobile device 202 for display in the user interface 106 of the mobile file browser 210.

At 312, a layer extraction is generated as a full-resolution image for each of the multiple layers of the multi-layered image. For example, the cloud-based image service 214 implements the extraction application 224 that generates the full-resolution layer extractions 232 (e.g., as full-resolution bitmaps) of each of the multiple layers of a multi-layered image 218. In an implementation, the Adobe Creative Cloud™ (e.g., the cloud-based image service 214) provides the extraction application 224 as a service to take apart and render all of the layers (or a group of layers) of a Photoshop™ document (PSD) individually. The extraction application 224 then combines one or more of the individual layer extractions 232 (e.g., the full-resolution bitmaps) into the component representation 234. The component representation also includes the component description 236 that indicates how the group of layer extractions in the component representation 234 are to be composited at the mobile device 202.

At 314, identifiers of layers that correspond to user selections of one or more of the image layer previews of the multi-layered image are received from the mobile device. For example, the cloud-based image service 214 receives identifiers of layers that correspond to user selections of the displayed image layer previews 114 in the user interface 106 of the mobile file browser 210 at the mobile device 202.

At 316, a component representation is generated of the layer extractions that correspond to the identified layers of the multi-layered image and at 318, the image service communicates the component representation of the layer extractions that correspond to the identified layers of the multi-layered image to the mobile device. For example, the extraction application 224 at the cloud-based image service 214 generates the component representation 234 of the layer extractions 232 that correspond to the identified layers selected as the image layer previews 114 of the multi-layered image 110. The component representation 234 also includes the component description 236, and the cloud-based image service 214 communicates the component representation 234 to the mobile device 202.

Figure 4:
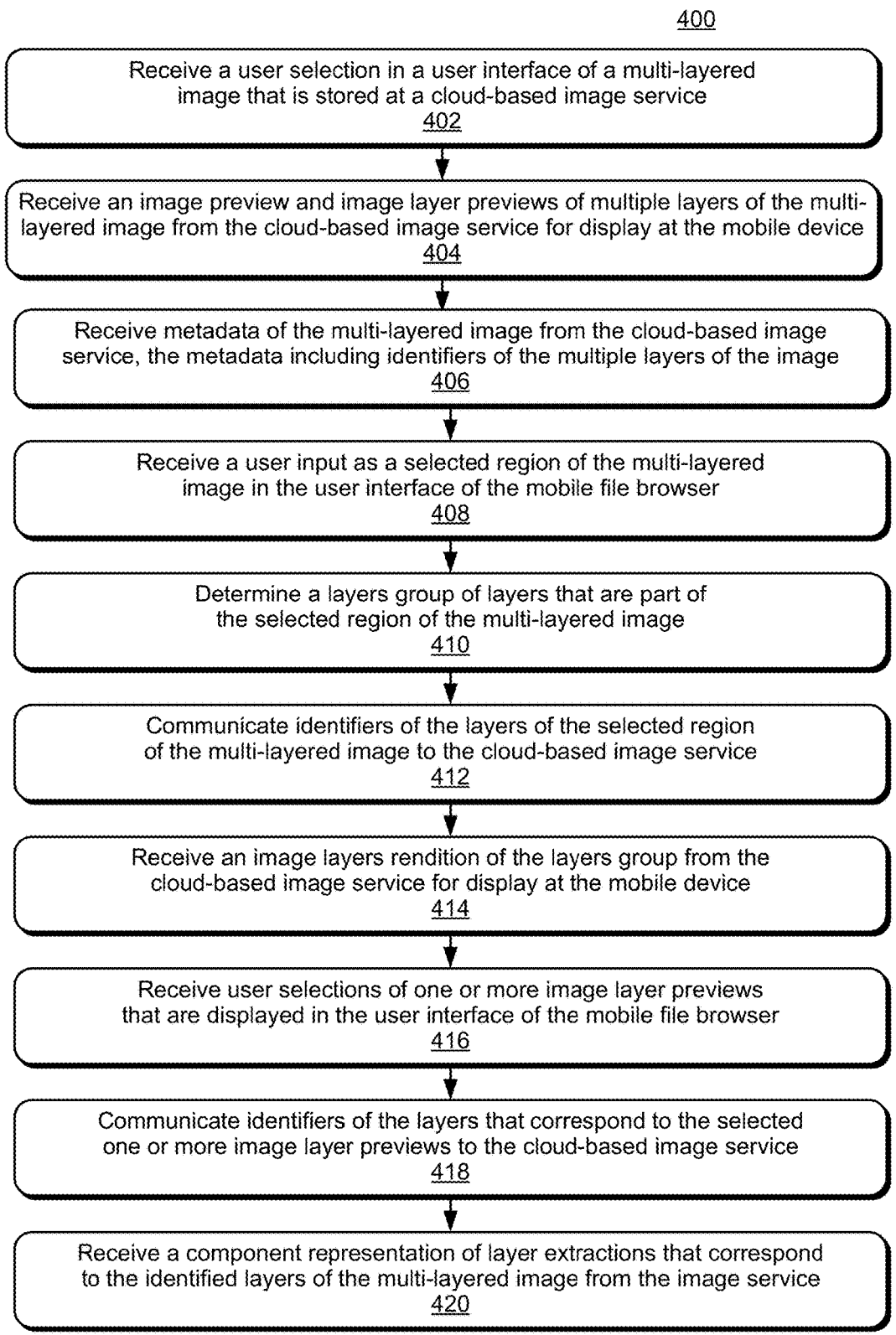
FIG. 4 illustrates example methods of document layer extraction for mobile devices in accordance with one or more embodiments of the techniques described herein.

FIG. 4 illustrates example method(s) 400 of document layer extraction for mobile devices, and is generally described with reference to the mobile device shown in the example system of FIG. 1. The order in which the method is described is not intended to be construed as a limitation, and any number or combination of the method operations can be combined in any order to implement a method, or an alternate method.

At 402, a user selection of a multi-layered image that is stored at a cloud-based image service is received in a user interface. For example, the mobile file browser 210 that is implemented by the mobile device 202 receives a user selection via the user interface 106 of one of the multi-layered images 218, such as a Photoshop™ document (PSD), that is stored in the data storage 216 at the cloud-based image service 214. The user initiates the selection of the multi-layered image in the user interface 106 of the mobile file browser 210, such as shown in FIG. 1 by the user touch-selection 108 of the image preview 104 that represents the multi-layered image 110 in the user interface 106 on the mobile device 102.

At 404, an image preview and image layer previews of multiple layers of the multi-layered image are received from the cloud-based image service for display at the mobile device. For example, the mobile device 202 receives an image preview 226 that is representative of the selected multi-layered image 218 from the cloud-based image service 214, and the image preview 104 is displayed in the user interface 106 of the mobile file browser 210. The mobile device 202 also receives the image layer previews 228 of the multiple layers of the multi-layered image 218 from the cloud-based image service 214 for display as the image layer previews 114 in the user interface 106. Examples are illustrated in FIG. 1 as the multi-layered image 110 and the image layer previews 114 displayed in the user interface 106 of the mobile file browser at 112, where the image layer previews 114 are thumbnail images or renditions that are each representative of one of the multiple layers of the multi-layered image. In implementations, only the image layer previews 228 that correspond to visible layers in the multi-layered image 218 displayed at the mobile device (e.g., as the image preview 104) are received from the cloud-based image service.

At 406, metadata of the multi-layered image is received from the cloud-based image service, the metadata including identifiers of the multiple layers of the multi-layered image. For example, the mobile device 202 receives the images metadata 220 of the multi-layered image 218 from the cloud-based image service 214, where the metadata includes identifiers of the multiple layers of the multi-layered image and is maintained as the image layers metadata 240 with the memory 208 at the mobile device.

At 408, a user input is received as a selected region of the multi-layered image in the user interface of the mobile file browser and, at 410, a layers group of layers that are part of the selected region of the multi-layered image is determined. For example, the mobile file browser 210 that is implemented by the mobile device 202 receives a user input of a selected image region 246 of the image preview 104 that is displayed in the user interface 106 of the mobile file browser. The layer extraction module 212 determines the layers of the layers group that are part of the selected image region 246 of the multi-layered image (e.g., displayed as the image preview 104) based on the identifiers of the layers that are included in the image layers metadata 240 received from the cloud-based image service 214. In implementations, the layers in the layers group that are part of the selected region of the multi-layered image are encompassed or at least partially intersected by a region selector, as shown and described with reference to FIGS. 8-10, where the region selector is displayed in the user interface 106 of the mobile file browser 210 as a user-drawn selection boundary 1004 or a user-sizeable layers viewing control 804.

At 412, identifiers of the layers of the selected region of the multi-layered image are communicated to the cloud-based image service and, at 414, an image layers rendition of the layers group is received from the cloud-based image service for display at the mobile device. For example, the mobile file browser 210 communicates the identifiers of the layers that are included in the layers group from the mobile device 202 to the cloud-based image service 214, and the imaging application 222 generates the image layers rendition 230 of the layers group. The mobile file browser 210 then receives back the image layers rendition 230 of the layers group from the cloud-based image service 214 for display at the mobile device.

At 416, user selections are received of one or more image layer previews that are displayed in the user interface of the mobile file browser and, at 418, identifiers of the layers that correspond to the selected image layer previews are communicated to the cloud-based image service. For example, the mobile file browser 210 receives user selections of one or more of the displayed image layer previews 114 in the user interface 106, and identifiers of the layers of the multi-layered image 110 (e.g., displayed as the image preview 104) that correspond to the selected image layer previews 114 are communicated to the cloud-based image service 214.

The extraction application 224 at the cloud-based image service 214 generates the component representation 234 of the layer extractions 232 that correspond to the identified layers selected as the image layer previews 114 of the multi-layered image 110. The component representation 234 also includes the component description 236. At 420, the component representation of the layer extractions that correspond to the identified layers of the multi-layered image is received from the cloud-based image service. For example, the mobile device 202 then receives the component representation 234 of the layer extractions 232 that correspond to the identified layers selected as the image layer previews 114 of the multi-layered image 110. The component representation 234 also includes the component description 236 received from the cloud-based image service. The mobile device 202 includes the image editing application 244 that a user of the mobile device can utilize to view and edit the full-resolution layers of the multi-layered image that are received at the mobile device as the layer extractions 232 in the component representation 234.

Figure 5:
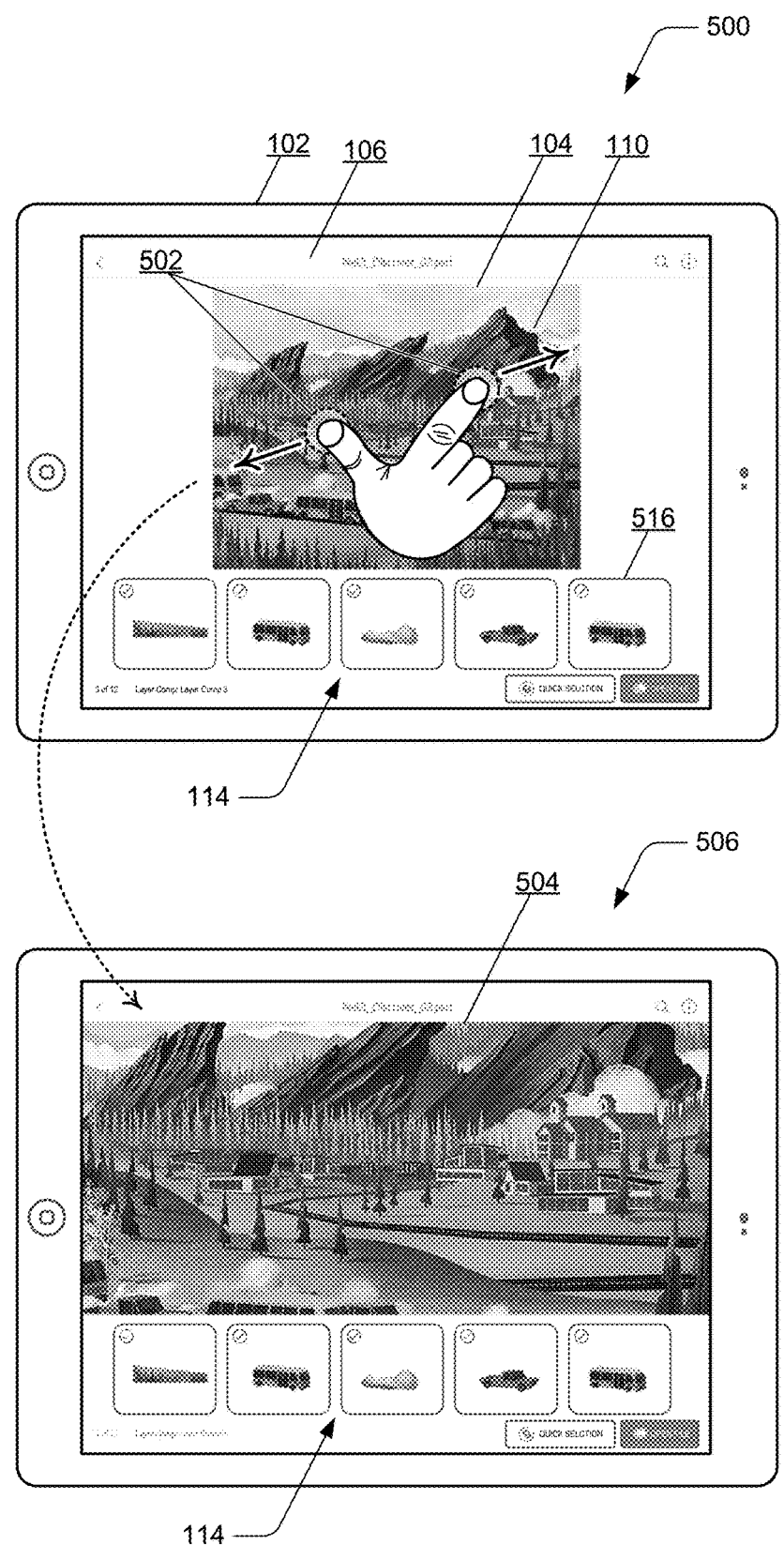
FIG. 5 illustrates an example of user interaction with an image preview that represents a multi-layered image in accordance with one or more embodiments of the techniques described herein.

FIG. 5 illustrates an example 500 of user interaction with the image preview 104 that represents the multi-layered image 110 displayed in the user interface 106 of the mobile file browser 210 on the mobile device 102, as shown and described with reference to FIGS. 1 and 2. In this example, a user can touch-select 502 to expand (or pinch-out) to zoom into the image preview 104, which is then displayed as the image preview 504 zoomed-in as shown at 506. The image layer previews 114 that represent and correspond to the image layers displayed in the image preview 504 are also displayed in a layers grid of the user interface 106 below the image preview 504 of the multi-layered image 110. Similarly, a user can touch-select to pinch-in to zoom out and see more of an image, such as to return from the image preview 504 shown at 506 back to the image preview 104 shown at 500.

Figure 6:
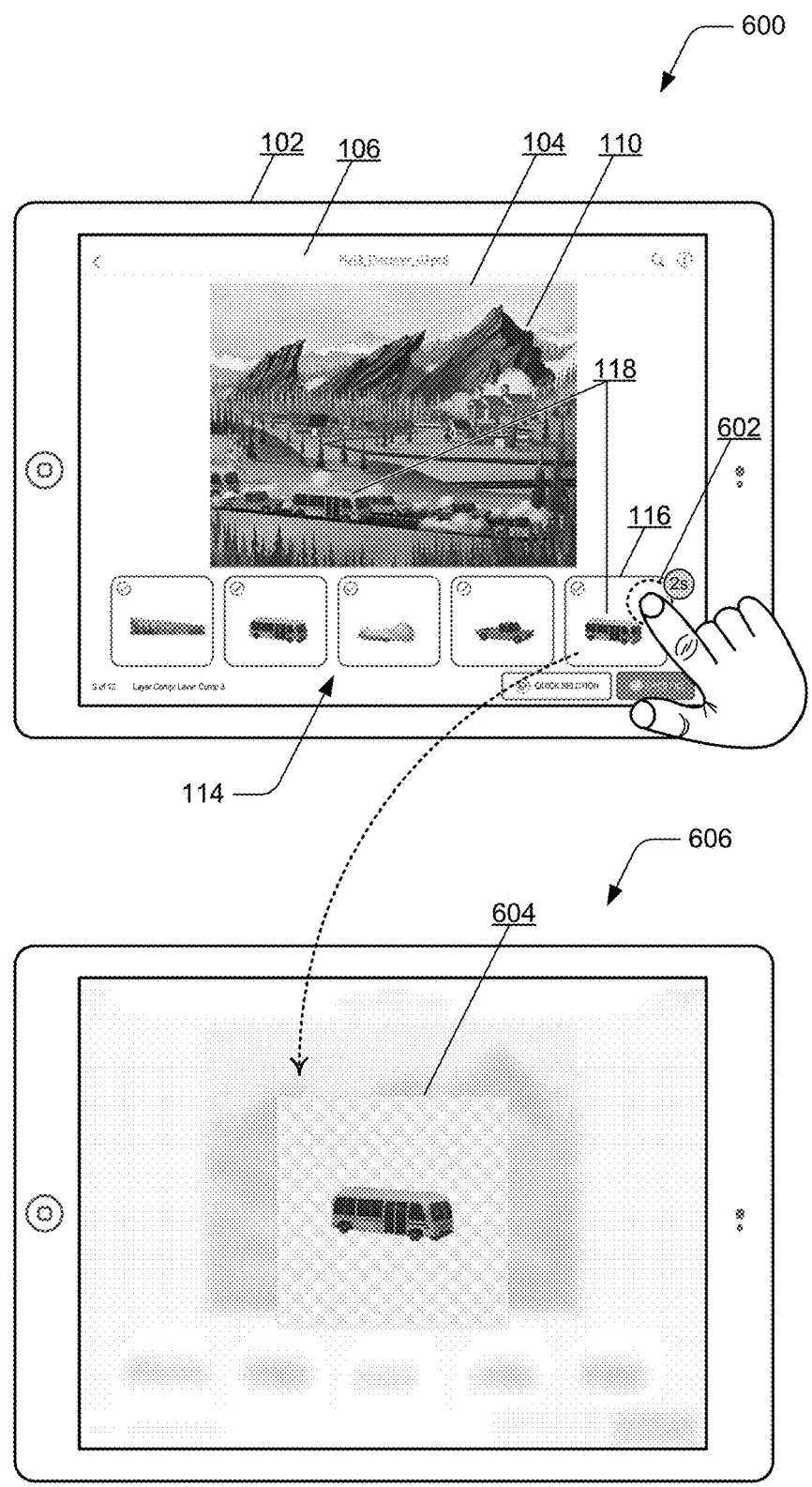
FIG. 6 illustrates an example of user interaction with an image layer preview that represents an image layer of a multi-layered image in accordance with one or more embodiments of the techniques described herein.

FIG. 6 illustrates an example 600 of user interaction with the image layer preview 116, which represents the image layer of the multi-layered image 110 that includes the bus object 118, as shown and described with reference to FIG. 1. In this example, a user can touch-select 602 pressing the image layer preview (or layer group preview) for approximately two seconds to initiate a layer preview 604 as shown at 606. A user can then dismiss the layer preview by tapping anywhere in the user interface 106 outside of the layer preview, returning to the image preview shown at 600.

Figure 7:
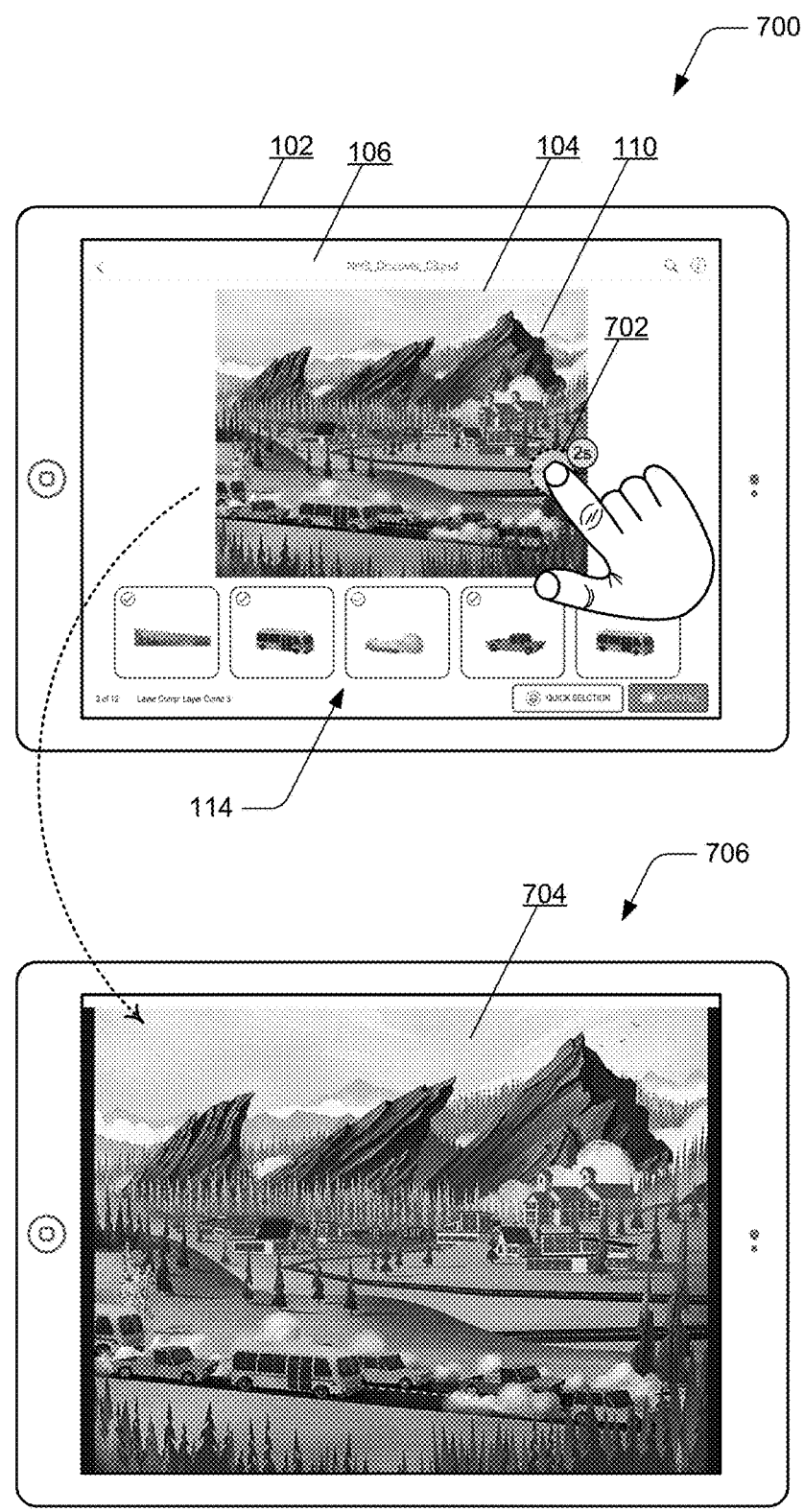
FIG. 7 illustrates an example of user interaction with an image preview that represents a multi-layered image in accordance with one or more embodiments of the techniques described herein.

FIG. 7 illustrates an example 700 of user interaction with the image preview 104 that represents the multi-layered image 110 displayed in the user interface 106 of the mobile file browser 210 on the mobile device 102, as shown and described with reference to FIGS. 1 and 2. In this example and similar to the user interaction described with reference to FIG. 6, a user can touch-select 702 pressing the image preview 104 for approximately two seconds to initiate a full-screen image preview 704 as shown at 706. A user can then dismiss the full-screen image preview by tapping anywhere in the user interface 106, returning to the image preview shown at 700.

Figure 8:
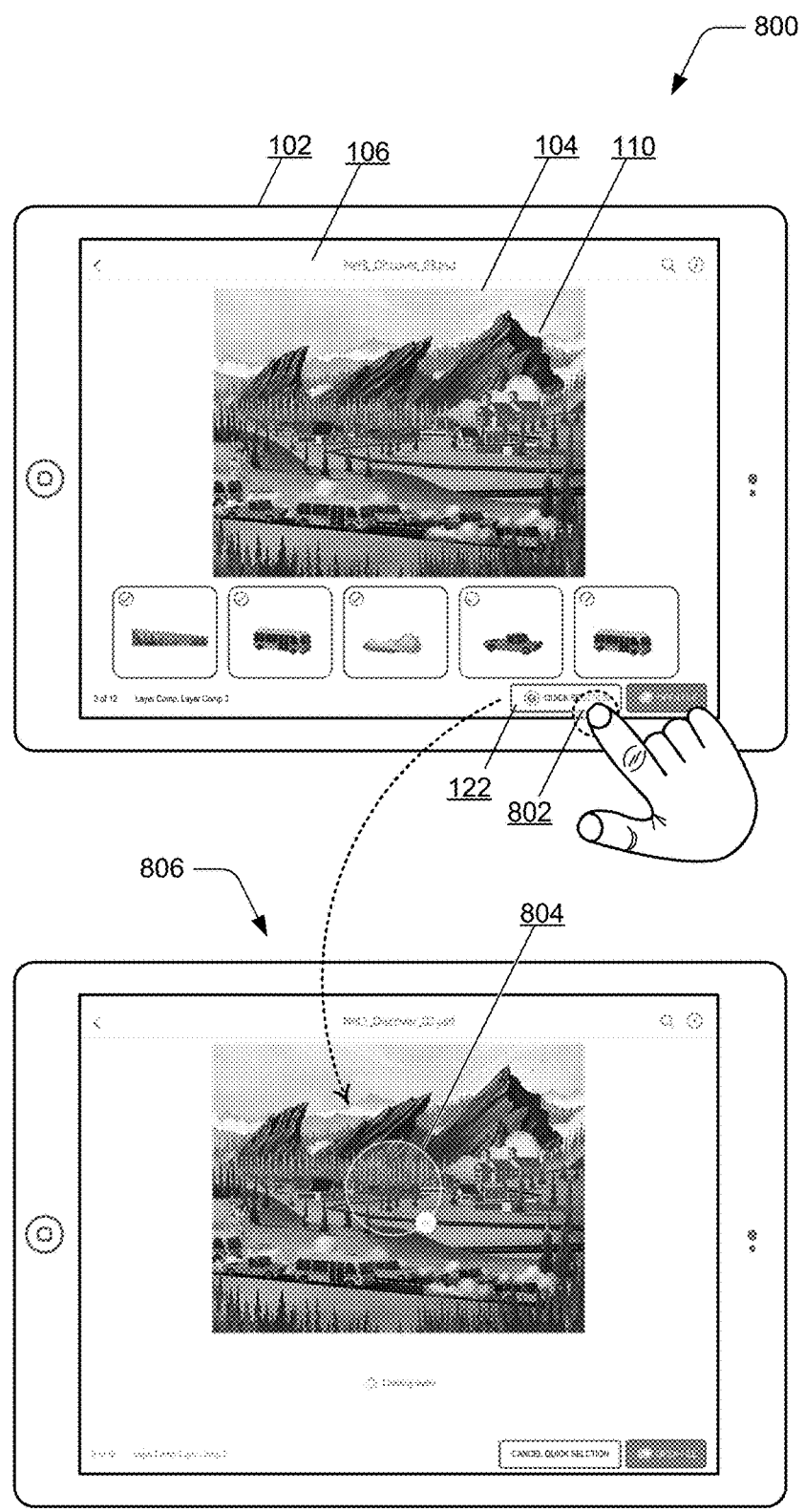
FIG. 8 illustrates an example of image layer navigation in an image preview that represents a multi-layered image in accordance with one or more embodiments of the techniques described herein.

FIG. 8 illustrates an example 800 of image layer navigation in the image preview 104 that represents the multi-layered image 110 displayed in the user interface 106 of the mobile file browser 210 on the mobile device 102, as shown and described with reference to FIGS. 1 and 2. In this example, a user can touch-select 802 the quick selection control 122 to initiate a user-sizeable layers viewing control 804 that is displayed in the user interface 106 over the image preview 104 as shown at 806. The user can navigate and preview the layers of the image preview 104 that are encompassed and/or intersected by the user-sizeable layers viewing control 804. In implementations, a user can expand the layers viewing control 804, such as with a pinch-out touch-select gesture as shown in FIG. 5 that increases the selected region of the image preview 104 that is displayed within the layers viewing control. Similarly, the user can reduce the layers viewing control 804, such as with a pinch-in touch-select gesture that decreases the selected region of the image preview 104 that is displayed within the layers viewing control.

Figure 9:
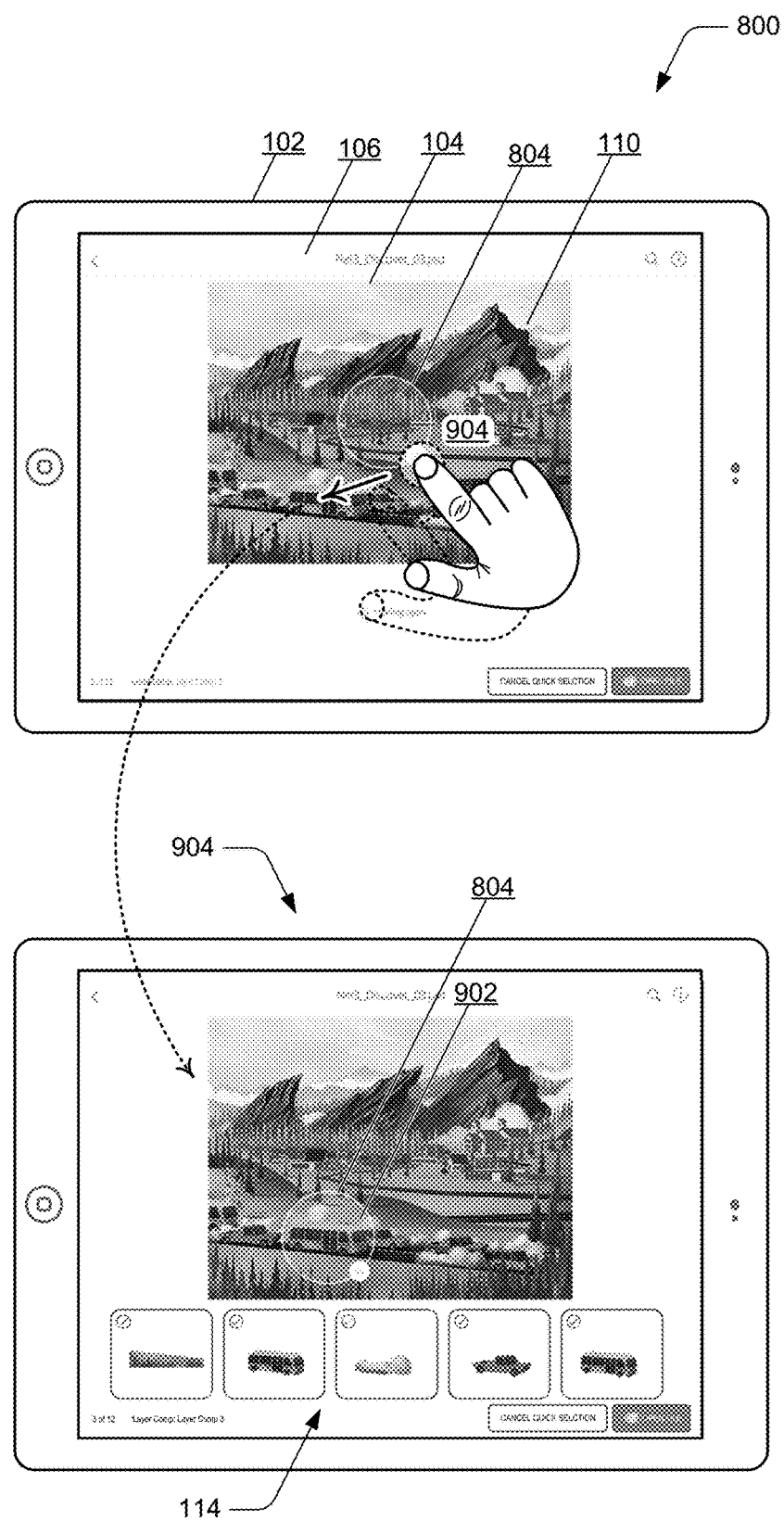
FIG. 9 illustrates an example of image layer navigation with a layers viewing control in an image preview that represents a multi-layered image in accordance with one or more embodiments of the techniques described herein.

FIG. 9 illustrates an example 900 of user interaction to move the layers viewing control 804 and select a region 902 of the image preview 104, as shown and described with reference to FIG. 8. In this example, a user can touch-select 904 the layers viewing control 804 and move it, such as with a drag-and-drop gesture, to select the region 902 of the image preview 104 as shown at 904. The image layer previews 114 that represent and correspond to the image layers displayed within the layers viewing control 804 are also displayed in a layers grid of the user interface 106 below the image preview 104 of the multi-layered image 110.

Figure 10:
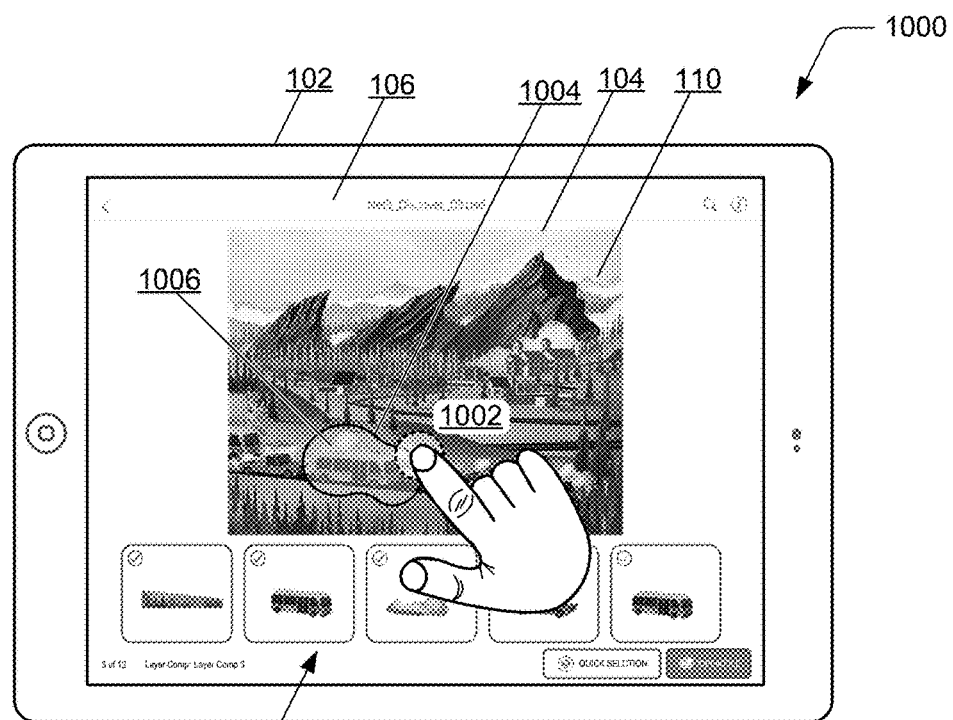
FIG. 10 illustrates an example of image layer navigation with a user-drawn selection boundary in an image preview that represents a multi-layered image in accordance with one or more embodiments of the techniques described herein.

FIG. 10 illustrates an example 1000 of image layer navigation on the image preview 104 that represents the multi-layered image 110 displayed in the user interface 106 of the mobile file browser 210 on the mobile device 102, as shown and described with reference to FIGS. 1 and 2. In this example, a user can touch-select 1002 to create a user-drawn selection boundary 1004 around a selected region 1006 of the image preview 104, and the user-drawn selection boundary 1004 is displayed in the user interface 106 over the image preview 104. The user can navigate and preview the layers of the image preview 104 that are encompassed and/or intersected by the user-drawn selection boundary 1004.

Figure 11:
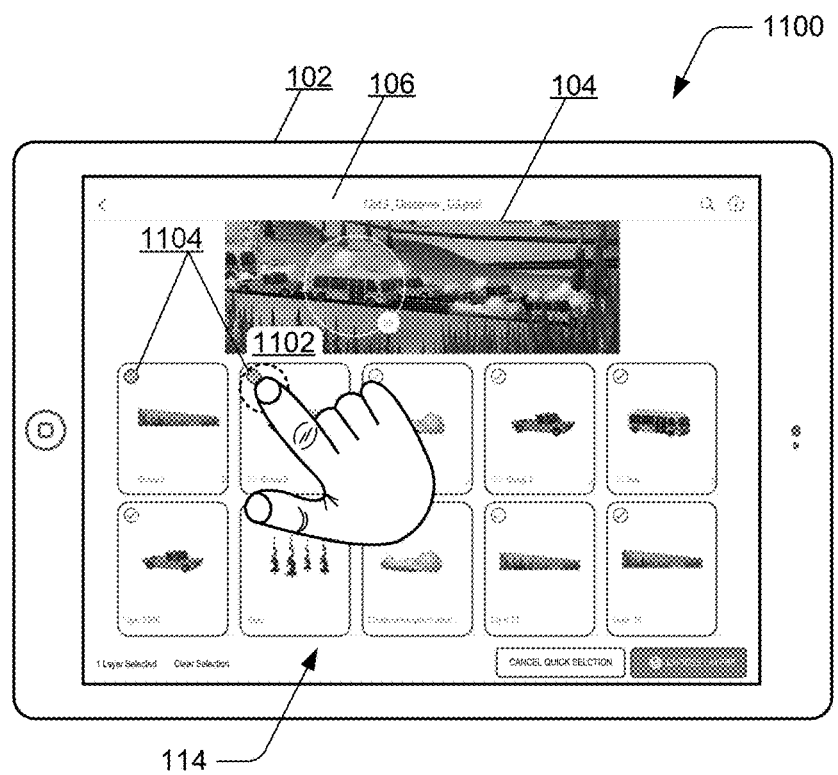
FIG. 11 illustrates an example of image layer navigation and layer selection of layers in an image preview that represents a multi-layered image in accordance with one or more embodiments of the techniques described herein.

FIG. 11 illustrates an example 1100 of image layer navigation and layer selection of the image layer previews 114 (and image layer groups) that represent and correspond to the image layers of a selected region of the image preview 104. In this example, a user can scroll to display more image layer previews of the layers and layer groups. In this example, a user can touch-select 1102 to select layers 1104, and the mobile file browser 210 initiates download of the layer extractions 232 that correspond to the selected layers from the cloud-based image service 214.

Figure 12:
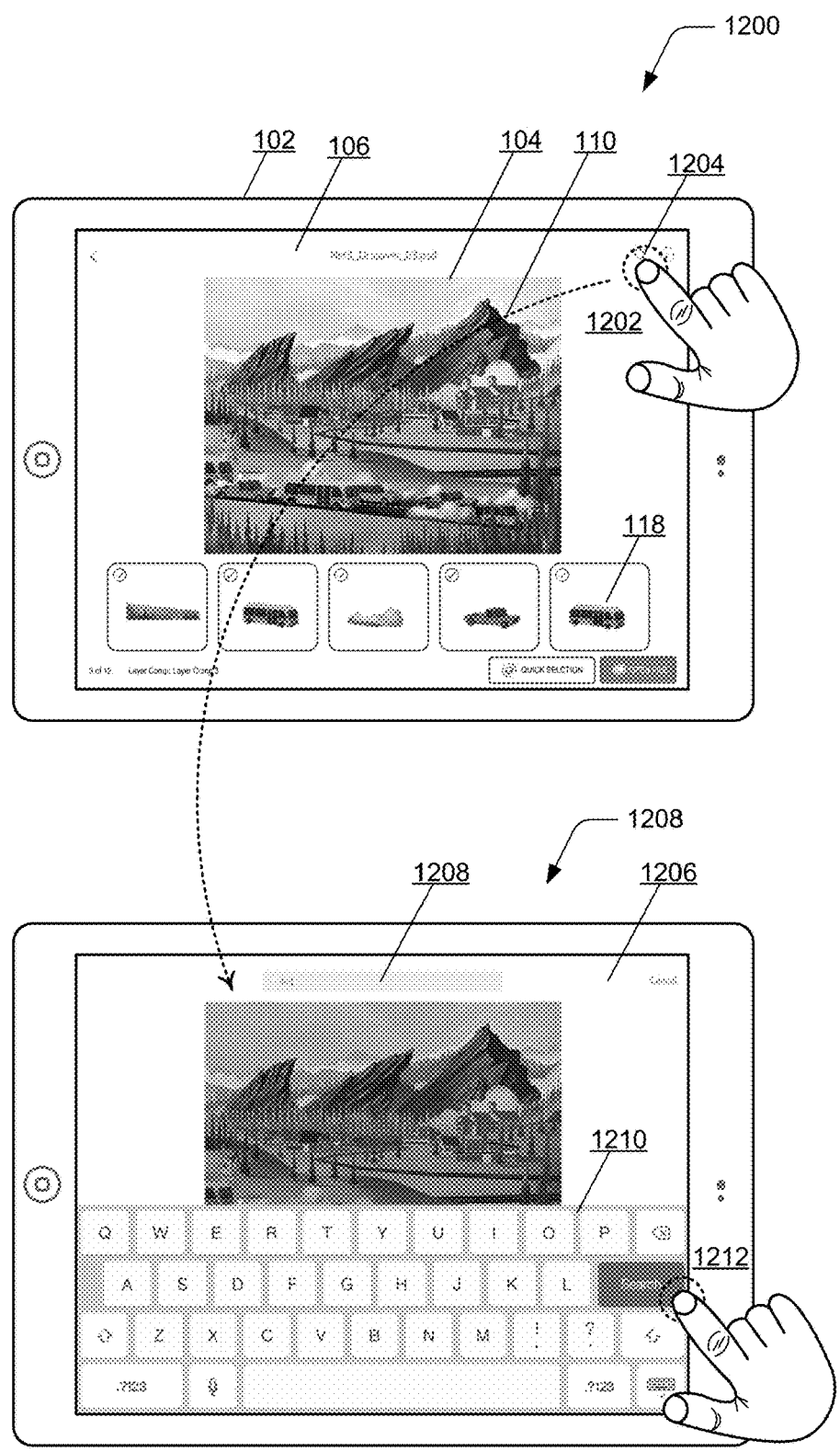
FIG. 12 illustrates an example of search layer navigation to search for a layer of an image preview that that represents a multi-layered image in accordance with one or more embodiments of the techniques described herein.

FIG. 12 illustrates an example 1200 of search layer navigation in the user interface 106 to search for the layer object 118 in the image preview 104 that represents the multi-layered image 110, which is displayed in the user interface 106 of the mobile file browser 210 on the mobile device 102. In this example, the user can touch-select 1202 a selectable search control 1204 to initiate a search interface 1206, as shown at 1208. The search interface 1206 includes a text-entry search field 1208, as well as a keyboard 1210 on which the user can type a layer name in the text-entry search field 1208, such as the layer name "bus" shown in this example. The user can then touch-select 1212 to initiate the search for the "bus" layer, which is shown displayed at 606 in FIG. 6.

Figure 13:
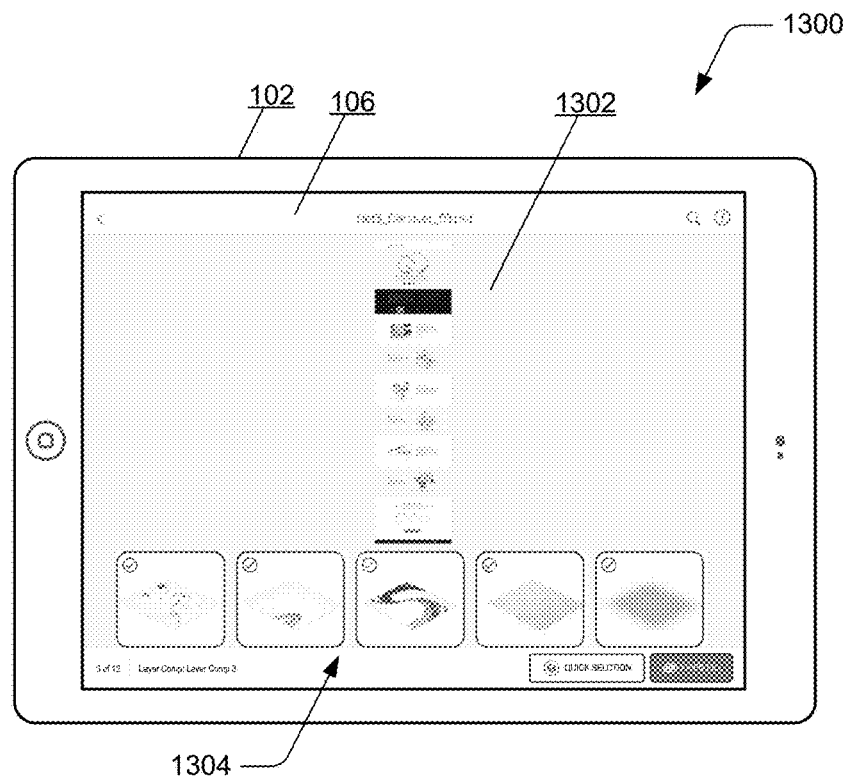
FIG. 13 illustrates an example of an image layers view of an image preview that that represents a multi-layered image in accordance with one or more embodiments of the techniques described herein.

FIG. 13 illustrates an example 1300 of an image layers view, referred to as a "Tall PSD" view 1302 of the image layer previews 1304 of an image preview displayed in the user interface 106 of the mobile file browser 210 on the mobile device 102. A user can select to view an image preview in the tall view format in the user interface.

Figure 14:
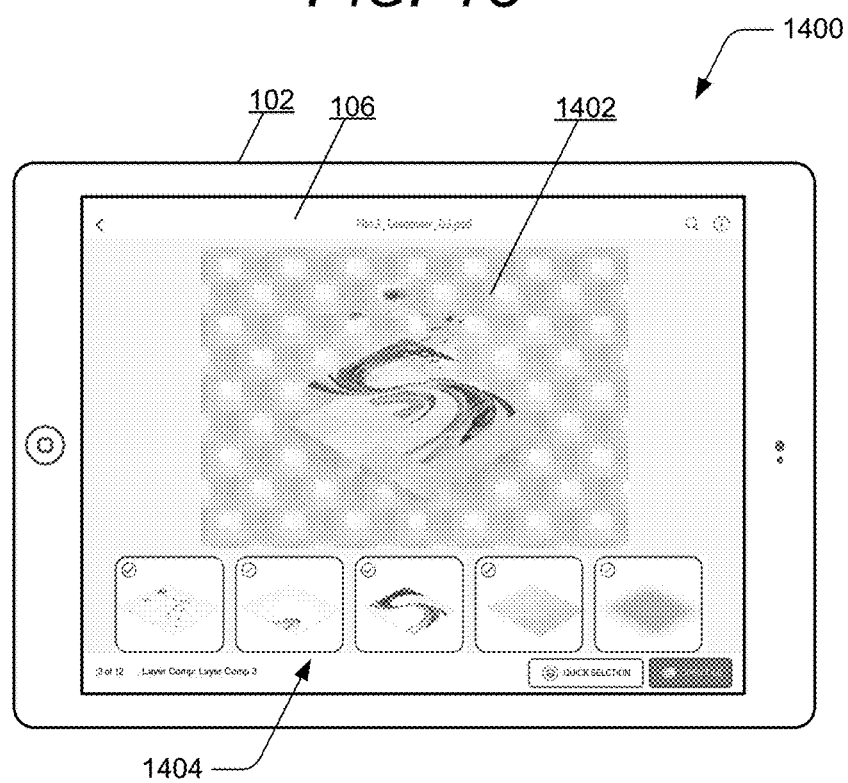
FIG. 14 illustrates another example of an image layers view of an image preview that that represents a multi-layered image in accordance with one or more embodiments of the techniques described herein.

FIG. 14 illustrates an example 1400 of an image layers view, referred to as a "Transparent PSD" view 1402 of the image layer previews 1404 of an image preview displayed in the user interface 106 of the mobile file browser 210 on the mobile device 102. A user can select to view an image preview in the transparent view format in the user interface.

Figure 15:
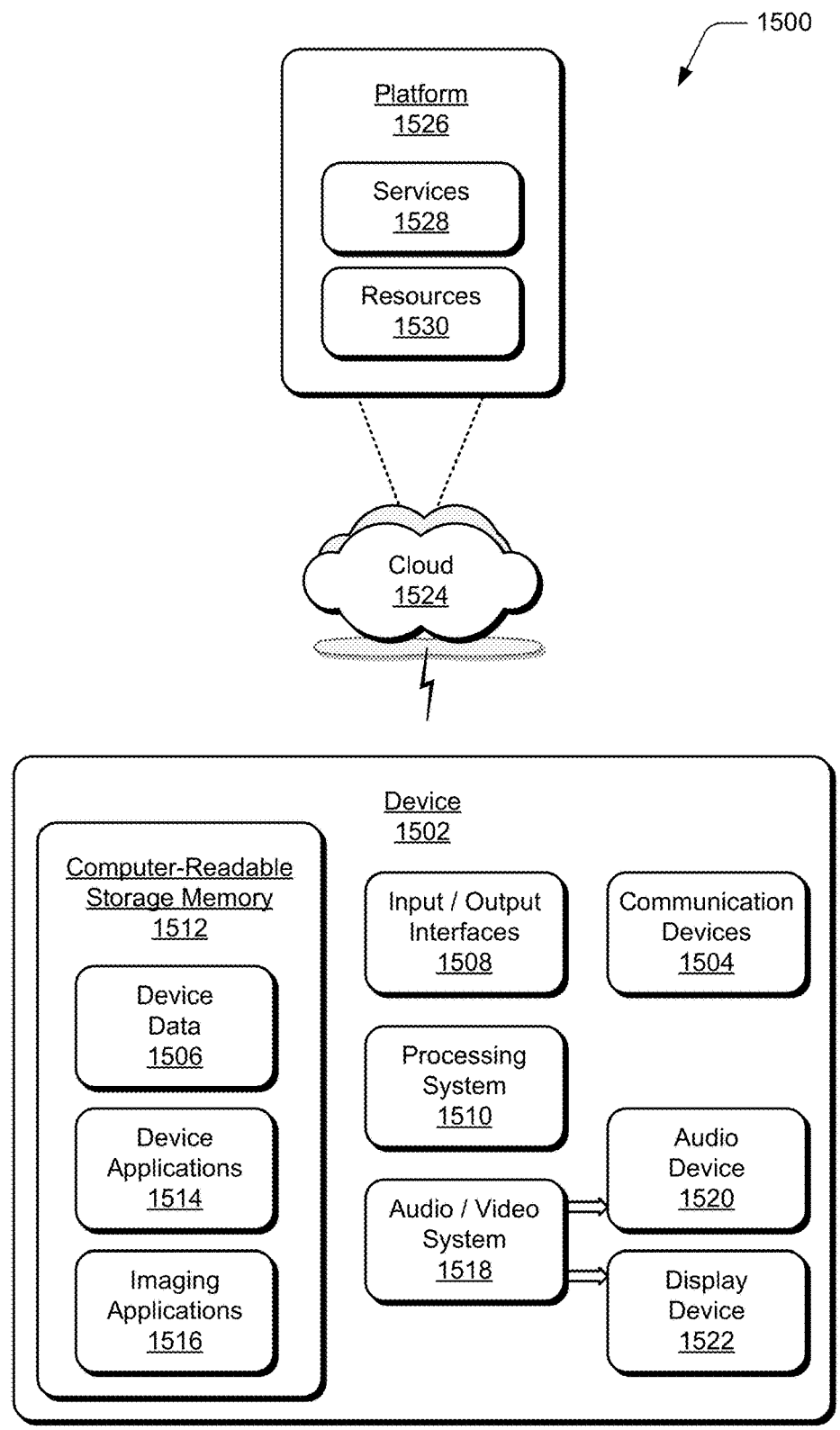
FIG. 15 illustrates an example system with an example device that can implement embodiments of document layer extraction for mobile devices.

FIG. 15 illustrates an example system 1500 that includes an example device 1502, which can implement embodiments of document layer extraction for mobile devices. The example device 1502 can be implemented as any of the computing devices and/or services (e.g., server devices) described with reference to the previous FIGS. 1-14, such as any type of computing device, client device, mobile phone, tablet, communication, entertainment, gaming, media playback, and/or other type of device. For example, the tablet device 102, the mobile device 202, and/or the cloud-based image service 214 shown in FIGS. 1 and 2 may be implemented as the example device 1502.

The device 1502 includes communication devices 1504 that enable wired and/or wireless communication of device data 1506, such as previews, renditions, images metadata, and image layer composites associated with multi-layered images that are transferred from one computing device to another, and/or synched between multiple computing devices. The device data can include any type of audio, video, and/or image data, such as the image previews, image layer previews, and image layer composites that is generated by applications executing on the device. The communication devices 1504 can also include transceivers for cellular phone communication and/or for network data communication.

The device 1502 also includes input/output (I/O) interfaces 1508, such as data network interfaces that provide connection and/or communication links between the device, data networks, and other devices. The I/O interfaces can be used to couple the device to any type of components, peripherals, and/or accessory devices, such as a digital camera device that may be integrated with device 1502. The I/O interfaces also include data input ports via which any type of data, media content, and/or inputs can be received, such as user inputs to the device, as well as any type of audio, video, and/or image data received from any content and/or data source.

The device 1502 includes a processing system 1510 that may be implemented at least partially in hardware, such as with any type of microprocessors, controllers, and the like that process executable instructions. The processing system can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1502 may further include any type of a system bus or other data and command transfer system that couples the various components within the device. A system bus can include any one or combination of different bus structures and architectures, as well as control and data lines.

The device 1502 also includes computer-readable storage memory 1512, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1512 provides storage of the device data 1506 and various device applications 1514, such as an operating system that is maintained as a software application with the computer-readable storage memory and executed by the processing system 1510. In this example, the device applications also include imaging applications 1516 that implement embodiments of document layer extraction for mobile devices, such as when the example device 1502 is implemented as the mobile device 202 or the cloud-based image service 214 shown in FIG. 2. Examples of the imaging applications 1516 include the mobile file browser 210 and the image editing application 244 that are implemented by the mobile device 102, and the imaging application 222 and the extraction application 224 that are implemented by the cloud-based image service 214, as described with reference to FIG. 2.

The device 1502 also includes an audio and/or video system 1518 that generates audio data for an audio device 1520 and/or generates display data for a display device 1522. The audio device and/or the display device include any devices that process, display, and/or otherwise render audio, video, display, and/or image data. In implementations, the audio device and/or the display device are integrated components of the example device 1502. Alternatively, the audio device and/or the display device are external, peripheral components to the example device. In embodiments, at least part of the techniques described for document layer extraction for mobile devices may be implemented in a distributed system, such as over a "cloud" 1524 in a platform 1526. The cloud 1524 includes and/or is representative of the platform 1526 for services 1528 and/or resources 1530. For example, the services 1528 may include the cloud-based image service 214 described with reference to FIG. 2.

The platform 1526 abstracts underlying functionality of hardware, such as server devices (e.g., included in the services 1528) and/or software resources (e.g., included as the resources 1530), and connects the example device 1502 with other devices, servers, etc. The resources 1530 may also include applications and/or data that can be utilized while computer processing is executed on servers that are remote from the example device 1502. Additionally, the services 1528 and/or the resources 1530 may facilitate subscriber network services, such as over the Internet, a cellular network, or Wi-Fi network. The platform 1526 may also serve to abstract and scale resources to service a demand for the resources 1530 that are implemented via the platform, such as in an interconnected device embodiment with functionality distributed throughout the system 1500. For example, the functionality may be implemented in part at the example device 1502 as well as via the platform 1526 that abstracts the functionality of the cloud 1524.

Although embodiments of document layer extraction for mobile devices have been described in language specific to features and/or methods, the appended claims are not necessarily limited to the specific features or methods described. Rather, the specific features and methods are disclosed as example implementations of document layer extraction for mobile devices, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method implemented for layer extraction of layers from a multi-layered image for independent layer editing at a mobile device, the method comprising:
  receiving a request from the mobile device for the multi-layered image;
  generating a layer extraction as a full resolution image of each of the layers of the multi-layered image;
  generating a component representation of the layer extractions that correspond to selected layers of the multi-layered image, the layer extractions being independently editable in the component representation;
  communicating the component representation of the layer extractions that are independently editable and correspond to the selected layers of the multi-layered image to the mobile device for use with an image editing application on the mobile device; and
  receiving image edit changes made to one or more of the selected layers in the component representation of the multi-layered image from the mobile device.

2. The method as recited in claim 1, wherein the component representation is generated to include a description of how the layer extractions in the component representation are to be composited at the mobile device, and wherein the layers of the multi-layered image include image layers and non-image layers.

3. The method as recited in claim 1, further comprising:
  communicating image layer previews of the layers of the multi-layered image to the mobile device for display in a user interface of a mobile file browser.

4. The method as recited in claim 3, wherein:
  the multi-layered image is a Photoshop™ document (PSD);
  the image preview is representative of the multi-layered image; and
  the image layer previews are thumbnail images that are each representative of one of the layers of the multi-layered image.

5. The method as recited in claim 3, further comprising:
  receiving, from the mobile device, identifiers of the selected layers that correspond to user selections of one or more of the image layer previews.

6. The method as recited in claim 5, further comprising:
  receiving the identifiers of the selected layers included in a layers group, the selected layers in the layers group being part of a selected region of the multi layered image and determined at the mobile device;
  generating an image layers rendition of the layers group; and
  communicating the image layers rendition of the layers group to the mobile device for display.

7. The method as recited in claim 6, further comprising:
  communicating metadata of the multi-layered image to the mobile device, the metadata including the identifiers of the layers of the multi-layered image, wherein the layers include image layers and non-image layers; and
  wherein the selected layers in the layers group of the selected region of the multi layered image are determined at the mobile device based on the identifiers included in the metadata.

8. The method as recited in claim 6, wherein the selected layers in the layers group that are part of the selected region of the multi-layered image are encompassed or at least partially intersected by a region selector.

9. The method as recited in claim 8, wherein the region selector is displayed in the user interface of the mobile file browser, the region selector comprising a user-sizeable layers viewing control.

10. A mobile device implemented for independent layer editing of layers from a multi-layered image, the mobile device comprising:
  a memory to store layer previews of the layers of the multi-layered image received from an image service for display at the mobile device;
  a processor to implement a mobile file browser configured to:
  receive layer previews of the layers of the multi-layered image from the image service for display at the mobile device;
  receive selected layers of the multi-layered image as user selections of one or more of the layer previews displayed in a user interface of the mobile file browser;
  communicate identifiers of the selected layers to the image service that generates a component representation of layer extractions that are each a full resolution image of a selected layer of the multi-layered image; and
  receive the component representation of the layer extractions that are independently editable and correspond to the selected layers of the multi-layered image for use with an image editing application on the mobile device.

11. The mobile device as recited in claim 10, wherein the mobile file browser is configured to:
  receive a description that indicates how the layer extractions in the component representation are to be composited at the mobile device; and
  determine a layer hierarchy of the layers in the multi-layered image from the description in the component representation.

12. The mobile device as recited in claim 10, wherein the mobile file browser is configured to receive metadata of the multi-layered image from the image service, the metadata including the identifiers of the selected layers of the multi layered image.

13. The mobile device as recited in claim 10, wherein:

the multi-layered image is stored at the image service as a Photoshop™ document (PSD); and the layer previews are thumbnail images that are each representative of one of the layers of the multi-layered image.

14. A computing device of an image service implemented for layer extraction of layers from a multi-layered image for independent layer editing at a mobile device, the computing device comprising:

memory to maintain the multi-layered image;

a processor to implement an extraction application to:

generate a layer extraction as a full resolution image of each of the layers of the multi-layered image;

generate a component representation of the layer extractions that correspond to selected layers of the multi-layered image that have been selected and identified at the mobile device, the layer extractions being independently editable in the component representation; and communicate the component representation of the layer extractions that are independently editable and correspond to the selected layers of the multi layered image to the mobile device for use with an image editing application on the mobile device.

15. The computing device as recited in claim 14, wherein the extraction application is implemented to generate the component representation to include a description that indicates how the layer extractions in the component representation are to be composited at the mobile device, and wherein the layers of the multi-layered image include image layers and non-image layers.

16. The cloud-based image service as recited in claim 14, wherein the memory is configured to maintain metadata of the multi-layered image for communication to the mobile device, the metadata including identifiers of the layers of the multi-layered image.

17. The computing device as recited in claim 14, wherein the processor implements an imaging application to generate image layer previews of the layers of the multi-layered image for communication to the mobile device for display.

18. The computing device as recited in claim 17, wherein the imaging application is implemented to receive identifiers of the selected layers that correspond to user selections of one or more of the image layer previews.

19. The cloud-based image service as recited in claim 18, wherein the imaging application is implemented to:

receive the identifiers of the selected layers included in a layers group, the selected layers in the layers group being part of a selected region of the multi layered image and determined at the mobile device; and generate an image layers rendition of the layers group that is communicated to the mobile device for display.

20. The computing device as recited in claim 17, wherein the imaging application is implemented to receive image edit changes made to one or more of the selected layers in the component representation of the multi-layered image from the mobile device.

* * * * *